US008938599B2

(12) United States Patent
Lee et al.

(10) Patent No.: US 8,938,599 B2
(45) Date of Patent: Jan. 20, 2015

(54) DISTRIBUTED GRAPH STORAGE SYSTEM

(75) Inventors: Michael Mihn-Jong Lee, La Jolla, CA (US); Indrajit Roy, Mountain View, CA (US); Vanish Talwar, Campbell, CA (US); Alvin AuYoung, San Jose, CA (US); Parthasarathy Ranganathan, San Jose, CA (US)

(73) Assignee: Hewlett-Packard Development Company, L. P., Houston, TX (US)

( * ) Notice: Subject to any disclaimer, the term of this patent is extended or adjusted under 35 U.S.C. 154(b) by 400 days.

(21) Appl. No.: 13/421,651

(22) Filed: Mar. 15, 2012

(65) Prior Publication Data
US 2013/0246731 A1 Sep. 19, 2013

(51) Int. Cl.
*G06F 12/02* (2006.01)

(52) U.S. Cl.
USPC .......................................... 711/170; 345/543

(58) Field of Classification Search
None
See application file for complete search history.

(56) References Cited

U.S. PATENT DOCUMENTS

| 8,667,012 | B2* | 3/2014 | Fuchs et al. | 707/770 |
|---|---|---|---|---|
| 2010/0257204 | A1* | 10/2010 | Orlov et al. | 707/783 |
| 2012/0188249 | A1* | 7/2012 | Kretz et al. | 345/440 |
| 2012/0317149 | A1* | 12/2012 | Jagota et al. | 707/798 |

OTHER PUBLICATIONS

Agarwal, V., et al., Scalable graph exploration on multicore processors, IEEE, SC10 Nov. 2010, New Orleans, Louisiana, USA, 11 pgs.
Aguilera, M., et al., A practical scalable distributed b-tree, PVLDB '08, Aug. 23-28, 2008, Auckland, New Zealand, VLDB Endowment, ACM., pp. 598-609.
Aguilera, M., et al., Sinfonia: A new paradigm for building scalable distributed systems, SOSP '07, Oct. 14-17, 2007, Stevenson, Washington, USA, pp. 159-174.
Dex, Sparsity Technologies, www.sparsity-technologies.com—2011, 214 pgs.
Gregor, D., et al., The Parallel BGL: A generic library for distributed graph computations, IOS Press Amsterdam, The Netherlands, (POOSC '05), Glasgow, UK, Jul. 2005, 18 pgs.
Infinite Graph, The Distributed Graph Database, Product Sheet (Release 2.0), Aug. 2011, 3 pgs.
Low, Y., et al., GraphLab: A new framework for parallel machine learning, the 26th Conference on Uncertainty in Artificial Intelligence (UAI 2010), Catalina Island, CA, Jul. 8-11, 2010, 10 pgs.
Malewicz, G., et al., Pregel: A system for large-scale graph processing, SIGMOD '10, Indianapolis, Indiana, USA, Jun. 6-11, 2010., pp. 135-145.
NEO, The Neo Database AB—A Technology Introduction, Nov. 23, 2006, 8 pgs.
Pearce, R., et al., Multithreaded asynchronous graph traversal for in-memory and semi-external memory, SC10 Nov. 2010, New Orleans, Louisiana, USA, 11 pgs.

(Continued)

*Primary Examiner* — Gary Portka
(74) *Attorney, Agent, or Firm* — Wagner Blecher; John Wagner (57) ABSTRACT

In a method of implementing a graph storage system, the graph storage system is stored on a plurality of computing systems. A global address space is provided for distributed graph storage. The global address space is managed with graph allocators, in which a graph allocator allocates space from a block of the distributed global memory in order to store a plurality of graphs.

15 Claims, 6 Drawing Sheets

(56) References Cited

OTHER PUBLICATIONS

Sarwat, M., et al., Horton: Online query execution engine for large distributed graphs, IEEE Computer Society, International Conference on Data Engineering (ICDE) Washington, DC, Apr. 1-5, 2012, 4 pgs.

Valiant, Leslie G., A bridging model for parallel computation, Communications of the ACM, Aug. 1990, vol. 33, No. 8, pp. 103-111.

* cited by examiner

DISTRIBUTED GRAPH STORAGE SYSTEM

BACKGROUND

Graph storage systems and relational storage systems are two types of storage systems with different structures. In general, graph storage systems map more directly to the structure of object oriented applications, than do relational storage systems. Presently, relational storage systems are more commonly utilized than graph storage systems.

BRIEF DESCRIPTION OF THE DRAWINGS

The accompanying drawings, which are incorporated in and form a part of this specification, illustrate and serve to explain the principles of embodiments in conjunction with the description. Unless specifically noted, the drawings referred to in this description should be understood as not being drawn to scale.

DESCRIPTION OF EMBODIMENTS

Reference will now be made in detail to various embodiments, examples of which are illustrated in the accompanying drawings. While the subject matter will be described in conjunction with these embodiments, it will be understood that they are not intended to limit the subject matter to these embodiments. Furthermore, in the following description, numerous specific details are set forth in order to provide a thorough understanding of the subject matter. In other instances, conventional methods, procedures, objects, and circuits have not been described in detail as not to unnecessarily obscure aspects of the subject matter.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signal capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present discussions terms such as "storing", "providing", "allocating", "performing", "migrating", "employing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Furthermore, in some embodiments, methods described herein can be carried out by a computer-usable storage medium having instructions embodied therein that when executed cause a computer system to perform the methods described herein.

Overview of Discussion

Example techniques, devices, systems, and methods for implementing a distributed graph storage system are described herein. Discussion begins with an example graph storage system. Discussion continues with an example graph structure. Next, example distributed storage and memory allocation in accordance with some embodiments is described. Discussion continues with an example of online data migration. An example fault toleration structure is then described. Next, an example computer environment is described. Lastly, two example methods of use are discussed.

Example Graph Storage System

Figure 1:
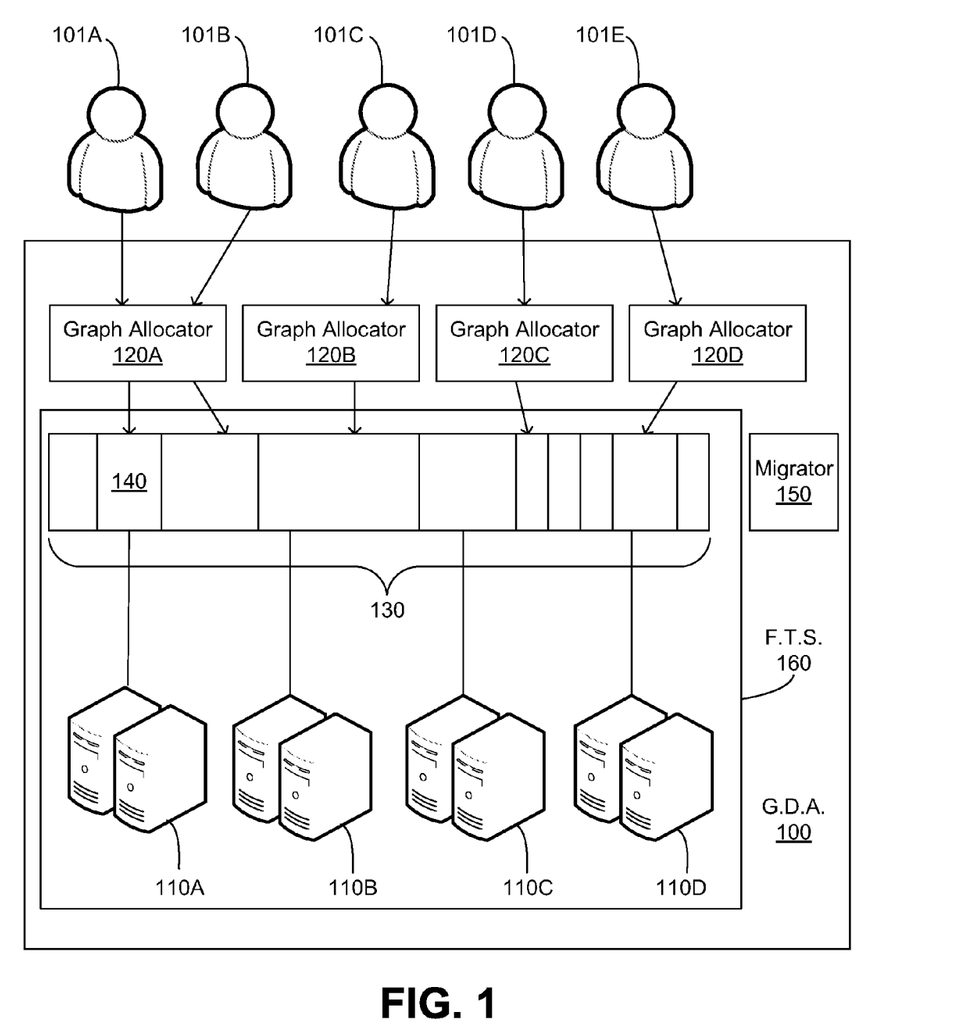
FIG. 1 shows an example distributed graph storage system in accordance with one embodiment.

FIG. 1 shows an example graph storage system 100 in accordance with one embodiment. As depicted in FIG. 1, servers 110 (110A, 110B, 110C and 110D) are presented as an example; it is appreciated that a greater or lesser plurality of servers may be utilized in the various embodiments described herein. For the purposes of the instant disclosure, the servers 110, memnodes 110, and clusters 110 are synonymous with one another. Graph storage system 100 also includes global address space 130. Global address space 130 can be provided by any distributed global memory implementation. Graph allocators 120 (120A, 120B, 120C and 120D) are also shown in accordance with one example. It is appreciated that a greater or lesser number of graph allocators 120 may be utilized. In one example, clients 101 (101A, 101B, 101C, 101D and 101E) make allocation requests to graph allocators 120 which invoke a buddy memory allocator 429 on each memnode 110 to manage global address space 130. A buddy memory allocator 429 (see FIG. 4) refers to a memory allocation technique that divides memory into partitions to satisfy memory requests while reducing space wastage. In one example, memory block 140 is allocated by graph allocators 120 and is stored in the memnodes 110. In one example, graph storage system 100 employs a fault toleration structure 160 such that graph storage system 100 is not affected by application clients 101 that issue queries but fail before a query completes. It should be understood that for the purposes of the instant disclosure, application clients 101 and clients 101 are used interchangeably. In some embodiments, graph storage system 100 includes migrator 150 which supports online migration of data across memnodes 110.

Figure 2:
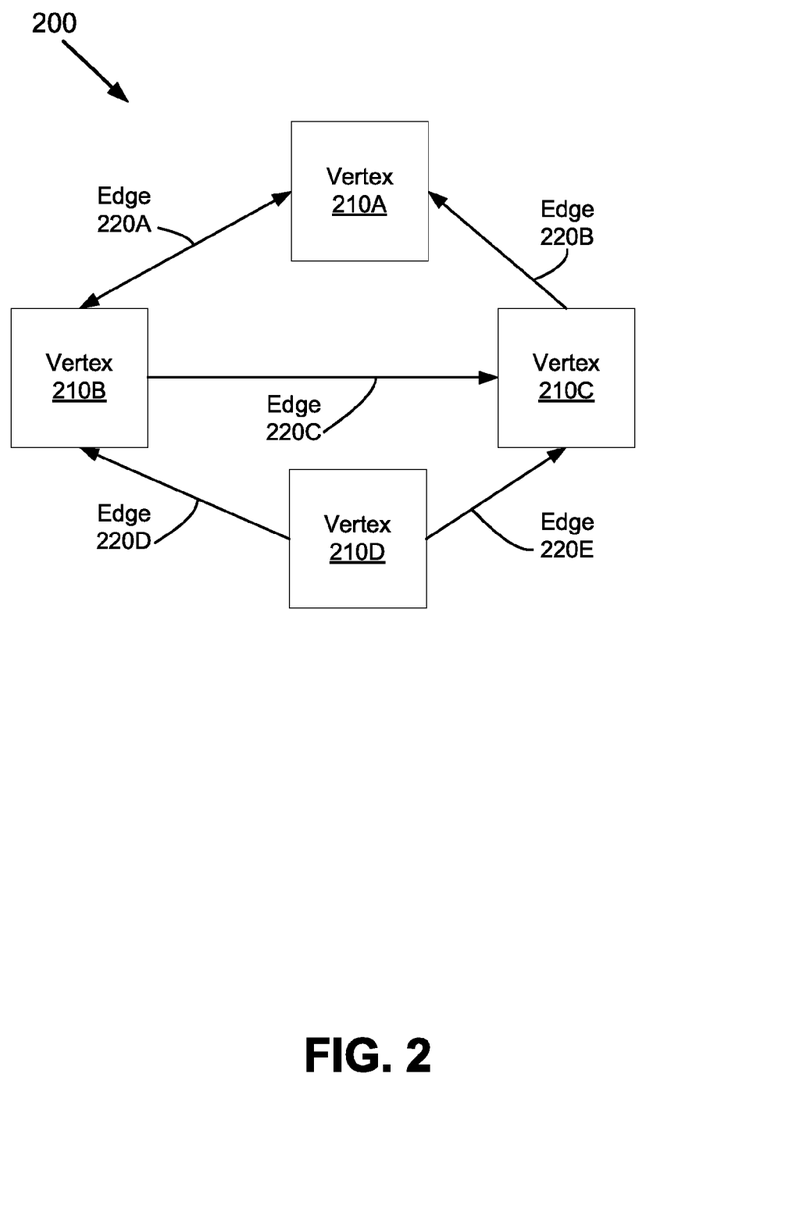
FIG. 2 shows an example graph in accordance with one embodiment.

FIG. 2 shows an example graph 200 comprising four vertex objects 210A, 210B, 210C and 210D. It should be understood that graph 200 is merely an example used for purposes of illustration, and that graphs may comprise many more vertex objects 210 than depicted in FIG. 2. For example, graphs with thousands, millions, or more vertex objects 210 may be stored. Example graph 200 further shows edge objects 220A, 220B, 220C, 220D and 220E. Additionally, example graph 200 shows property objects 230A, 230B, 230C, and 230D. In some embodiments, vertex objects 210 and edge objects 220 are stored inside pre-allocated memory blocks 140 while property objects 230 are directly allocated amongst memnodes 110 using the buddy memory allocator 429 within each memnode 110. In other embodiments property objects 230 may be stored inside pre-allocated memory blocks 140.

In one embodiment, graph storage system 100 employs four properties: (1) support for low latency, interactive graph queries; (2) transactional semantics for fast and consistent updates; (3) distributed storage for fast and consistent updates; and (4) server-side event driven processing. In one example, graph storage system 100 can be tailored to support a variety of graph applications. For example, graph storage system 100 can be tailored to support real-time analysis of influential online players in a large social network. As other examples, graph storage system 100 can be tailored to analyze search trends, social network trends, or traffic patterns.

Graph storage system 100 is designed to be distributed, allowing it to scale performance with both the data set size and client 101 request rate. By "distributed," what is meant is that portions of graph 200 are stored across, and are dynamically updatable across, a plurality of servers 110. Servers 110, sometimes referred to as computing systems, may be distributed. For example, servers 110 may employ a distributed computing system consisting of multiple autonomous computers that communicate through a network. In distributed computing, computer systems interact with each other to achieve a common goal. Servers 110 may be in the same physical location (e.g., in the same building), or geographically separated (e.g., in different countries). Distribution allows graph storage system 100 to support server-side processing of parallel graph processing techniques, which removes unnecessary network round-trip times between clients 101 and servers 110 during computation. Moreover, in one example, distributed storage allows graph storage system 100 to handle dynamic workloads and changes in the cluster size by dynamically migrating internal data structures across servers 110.

Graph storage system 100 allows graph objects to be distributed across servers 110 to scale storage, balance client 101 load, and support concurrent operations by adding more memory to global address space 130 and/or by adding more servers 110 as desired. Concurrent operations are useful for supporting the implementation of distributed graph techniques, for example the Bulk Synchronous Parallel programming model. In Bulk Synchronous Parallel programming, multiple processors are connected by a communication network and perform a sequence of global steps to execute the program. Graph storage system 100 exports an interface for server side processing of distributed graph functions which can be directly invoked by client 101. For example, distributed graph functions include k-hop and k-core, where k-hop refers to a situation where k is a natural number and hop refers to the number of links between a source and a destination, and k-core refers to a function that determines the k-core of a graph, which is the largest subgraph in which every vertex is connected to at least k other vertices within the subgraph.

In one embodiment, graph storage system 100 uses distributed memnodes 110 and minitransactions for concurrency-safe access to graph objects stored across servers 110. Minitransactions, in one example, are distributed compare-and-swap type primitives used to access data. Minitransactions ensure that concurrent updates maintain consistency in the presence of failures. Minitransactions optimize on the two-phase commit protocol to reduce network round-trip delays. By using this technique, programmers may rely on fault tolleration structure 160, which will be described in further detail below. Due to the efficient in-memory layout and transactional primitives, graph storage system 100 can safely support thousands of update operations per second. The transactional semantics also allow subgraphs to migrate online across servers 110 when the cluster size changes or hotspots occur.

In one embodiment, graph storage system 100 provides scalable and high throughput storage in support of interactive graph queries. For example, graph storage system 100 can be implemented in a data center where network links are of high bandwidth and network partitions are rare. Implementation in such a data center may help to achieve low latency processing and simplify the handling of faults.

Example Graph Structure

Figure 3:
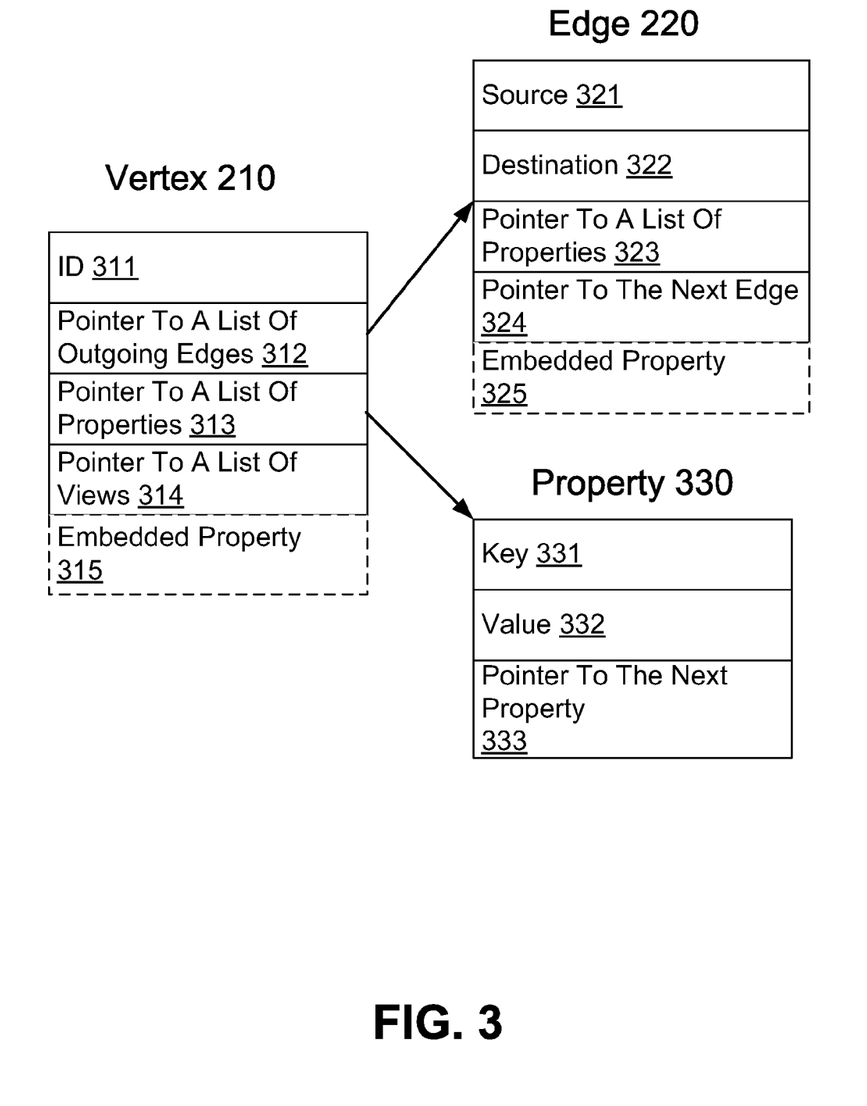
FIG. 3 shows an example vertex object, an example edge object and an example property object in accordance with one embodiment.

FIG. 3 shows vertex objects 210, edge objects 220 and property objects 230 represented as records with pointers. FIG. 3 shows an example internal structure of vertex object 210. A fundamental difference between relational storage systems and graph storage systems is the data layout. In one embodiment, graph storage system 100 provides support for graph data structures by internally representing graph 200 (e.g., G=(V,E)) as a set of vertex objects 210 and edge objects 220. Both vertex objects 210 and edge objects 220 can have associated property objects 230. Graph objects can be distributed to scale storage, balance client 101 load, and support concurrent operations. In the same way, graph storage system 100 can scale by distributing a data set across partitions (e.g., distributed or local).

In one embodiment, vertex object 210 comprises an identification (ID) 311, a pointer to a list of outgoing edges 312, a pointer to a list of properties 313, and a pointer to a list of views 314. Pointer to a list of outgoing edges 312 allows all outgoing edge objects 220 of a vertex object 210 to be accessed sequentially starting from the first edge object 220 in a vertex object 210. In some embodiments vertex object 210 includes an embedded property 315. For example, embedded property 315 could include information regarding a property that is frequently retrieved by client 101. In some embodiments, embedded property 315 is a predetermined size. In other embodiments, the size of embedded property 315 may be dynamic. For example, if graph storage system 100 receives a certain percentage of queries for a particular property object 230, graph storage system 100 may adjust the size of the embedded property 315 such that embedded property 315 may store a particular property object 230.

In one embodiment, edge object 220 comprises a source 321, a destination 322, a pointer to a list of properties 323, and a pointer to the next edge 324 of the source vertex object 210. In some embodiments edge object 220 includes an embedded property 325. Similar to the vertex objects, embedded property 325 may be fixed in size in some embodiments, while in other embodiments the size of embedded property 325 may be dynamic.

In one embodiment, property object 230 comprises a key 331, a value 332, and a pointer to the next property 333 of source vertex object 210 or source edge object 220. Both vertex objects 210 and edge objects 220 point to the head of their property list. A property object 230 can be shared by multiple vertex objects 210 or edge objects 220.

In one embodiment, each vertex object 210 and edge object 220 is a fixed size record while a property object 230 may be variable in size depending on the amount of data contained in property object 230. Due to the fixed size, a vertex object 210 or edge object 220 can be retrieved from a memnode 110 in one minitransaction as both the address and size of the data are known in advance. This technique provides for a reduction of overhead and network latency.

In some embodiments, accessing the property objects 230 of vertex object 210 or edge object 220 requires more than one network round trip. First vertex object 210 has to be read to determine the address of property object 230 and then property object 230 is read in the next minitransaction. In some applications certain property objects 230 are accessed often. For example, in a road network each vertex object 210 may be a sensor where speed is a property object 230 which is updated every few seconds, or in real time in some embodiments. To efficiently retrieve frequently accessed objects, certain property objects 230 can be embedded as embedded property 315 in the vertex object 210 or edge object 220. By embedding a frequently accessed property, a network round trip is eliminated because rather than accessing a vertex object 210 to retrieve the address of property object 230, and then making a second network access to retrieve property object 230; a single direct access to a vertex object 210 is involved in retrieving embedded property 315.

Example Distributed Storage and Memory Allocation

Figure 4:
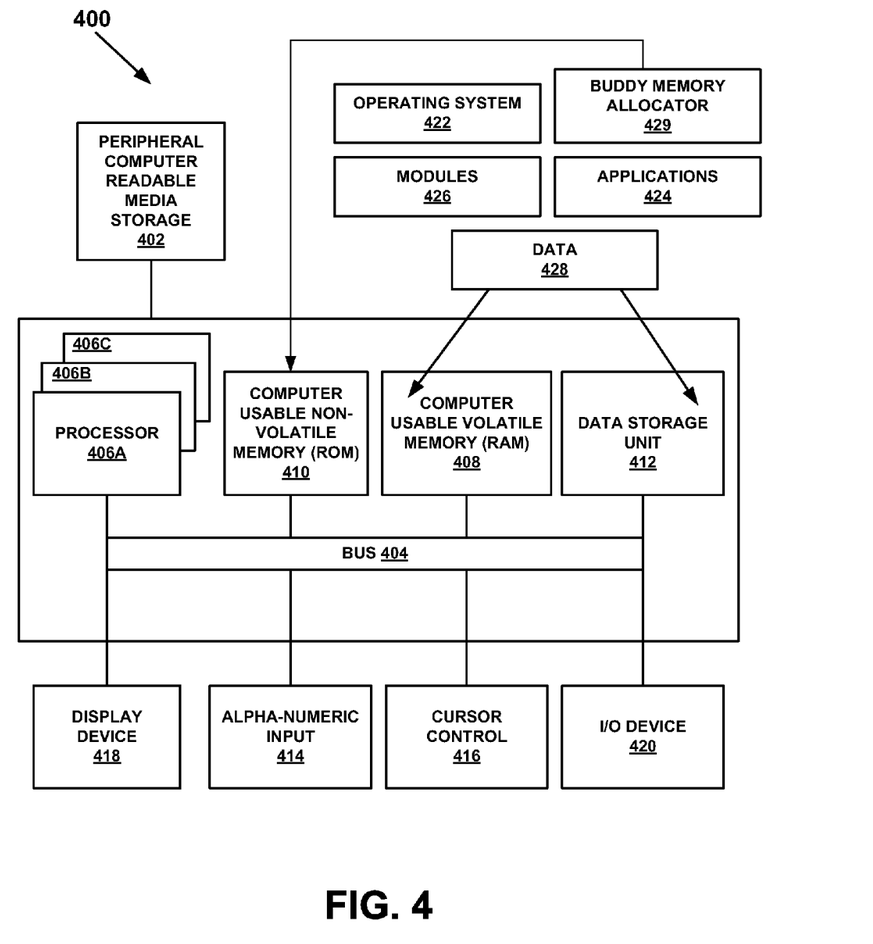
FIG. 4 is a block diagram of a system used in accordance with one embodiment.

In some embodiments graph allocators 120 can pre-allocate large memory blocks 140 of global address space 130 from the buddy memory allocator 429 of server 110 and append vertex objects 210 and edge objects 220 until memory block 140 is full. Generally, a buddy memory allocator 429 refers to a memory allocation technique that divides memory into partitions to satisfy memory requests. In one example, graph storage system 100 employs buddy memory allocators 429 and the graph allocators 120 to pre-allocate blocks of the distributed global memory from the buddy memory allocators 429 to reduce network roundtrips during allocation. Deletion of a vertex object 210 or edge objects 220 within a pre-allocated memory block 140 may result in internal fragmentation. This fragmentation can be reduced through periodic compaction. Pre-allocating memory blocks 140 reduces write conflicts between minitransactions issued by graph allocators 120 and also reduces latency when bulk loading data.

In one example, when a request is made to create a graph element (e.g., vertex object 210, edge object 220, or property object 230), graph storage system 100 initiates an allocation from the global address space 130 and assigns a unique address to the graph element. As discussed herein, these requests employ graph allocators 120 which in turn invoke a buddy memory allocator 429 on each memnode 110 which is used to manage memory space. Buddy memory allocation, as discussed herein, is a simple technique which reduces memory fragmentation and supports memory compaction. All meta-data in a memory block 140 related to the buddy memory allocator 429 is stored in the memnode 110 itself. Therefore, the failure of a graph allocator 120 does not cause memory leakage. Neither do such failures reduce availability as clients 101 can connect to other graph allocators 120. Graph allocators 120 leverage minitransactions to ensure correctness in the presence of concurrent operations. Minitransactions ensure that the meta-data in memory block 140 for the buddy memory allocator 429 remains consistent.

In one example, distributed graph storage system 100 allows clients 101 to directly use functions shown in Table 1, rather than multiple client server communication steps. Memnodes 110 may be implemented in conjunction with the remote procedure call (RPC) framework to support dispatch of messages between memnodes. It should be understood by those skilled in the art that an RPC is an inter-process communication that allows a computer program to cause a subroutine or procedure to execute in another address space without the programmer explicitly coding the details for the remote interaction. In such implementations servers 110 have a configurable number of threads in their threadpools which handle queries to the local memnode 110 and also inter-server 110 communication.

TABLE 1

Example class functions for parallel in-store graph processing

| Function | Description |
| --- | --- |
| Vertex[ ] getVertices( ) | Retrieve the vertices in the view |
| State getState( ) | Retrieve state of the view |
| void setState(s) | Modify the state of the view |
| void compute(M*) | Compute using incoming messages |
| void sendMessage (View, M) | Send message to a view |
| void voteHalt( ) | Send vote to others |

In some embodiments, during each phase of a distributed graph operation, each memnode 110 goes through a list of views and invokes their compute function. Messages generated during the phase are added to a per-memnode message queue. These messages are asynchronously sent to receivers which may be on remote servers 110. All messages are guaranteed to be received before the next phase begins. In some embodiments, the maximum number of messages that may be addressed to a single receiver are batched and then sent in one RPC invocation.

As an example of a distributed graph operation calculating the 3-hop neighbors of a vertex object 210, the compute function takes a list of vertex objects 210 as its input and calculates the unvisited immediate neighbors of all the input vertex objects 210. Initially, the client 101 sends the 3-hop request to the server 110 that stores the source vertex object 210. The server 110 executes the compute function to get the immediate neighbors of the source vertex object 210. In the message exchange phase the 1-hop vertex objects 210 are sent to servers 110 that may be storing these 1-hop vertex objects 210. In the next two phases, each server 110, in-parallel, computes the next hop neighbors of the newly encountered vertex objects 210 and then propagates the information to other servers 110. Therefore, all the 3-hop neighbors are found at the end of the second message exchange phase and returned to the client.

Example Online Data Migration

In some embodiments, graph storage system 100 supports online migration of data across servers by implementing migrator 150. Migration is a useful feature when new servers 110 are added to graph storage system 100. Table 2 shows two example migrate functions that are available to clients 101. As an example, the function migrateVertex moves a vertex with all its outgoing edge objects 220 and property objects 230 to the specified server 110. Similarly, example function migrateView moves a subgraph to a specified server 110. Functions can be used with a monitoring and management logic to determine when the migration should occur.

TABLE 2

Example functions to migrate data

| Function | Description |
| --- | --- |
| migrateVertex (V, s) | Move vertex and its data to server s |
| migrateView(View, s) | Move view elements to server s |

Data migration is an online operation which means that, in some examples, other non-conflicting operations may continue in the system. Migration may be implemented as a series of tasks wrapped inside transactions. For example, when migrating a vertex object 210 and all its associated data to a new server 110, a copy is created on the new server 110, the original copy is deleted, and all incoming pointers to the vertex object 210 are updated. In some embodiments, for undirected graphs 200 information about incoming edge objects 220 is available with vertex objects 210 since edge objects 220 are bidirectional.

Example Fault Toleration Structure

In one embodiment, a fault toleration structure 160 is employed by graph storage system 100. Fault toleration structure 160 can be a consequence of the employment of mini-transactions and memnodes 110. For example, graph storage system 100 employs distributed memnodes 110 and mini-transactions for concurrency-safe access to graph objects stored across machines. Graph storage system 100 transparently handles client 101 failures. Graph storage system 100 is not affected by application clients 101 that issue queries but fail before a query completes. In some examples, for memnode 110 failures, graph storage system 100 provides configuration options that support disk images, logging, and primary-backup replication. Disk images and logging ensure crash recovery of memnodes 110 as long as the disks can be accessed. Replication provides higher availability but increases the overheads as data has to be synchronized to the backup before returning results. Depending upon requirements, a client 101 may use various graph storage system 100 options to make the memnodes 110, and hence itself, fault tolerant.

Example Computer System

With reference now to FIG. 4, all or portions of some embodiments described herein are composed of computer-readable and computer-executable instructions that reside, for example, in computer-usable/computer-readable storage media of a computer system. That is, FIG. 4 illustrates one example of a type of computer (computer system 400) that can be used in accordance with or to implement various embodiments which are discussed herein. It is appreciated that computer system 400 of FIG. 4 is an example and that embodiments as described herein can operate on or within a number of different computer systems including, but not limited to, general purpose networked computer systems, embedded computer systems, routers, switches, server devices, client devices, various intermediate devices/nodes, stand alone computer systems, media centers, handheld computer systems, multi-media devices, and the like. In one embodiment, computer system 400 may be a single server 110, of servers 110 illustrated in FIG. 1. Computer system 400 of FIG. 4 is well adapted to having peripheral tangible computer-readable storage media 402 such as, for example, a floppy disk, a compact disc, digital versatile disc, other disc based storage, universal serial bus "thumb" drive, removable memory card, and the like coupled thereto. The tangible computer-readable storage media is non-transitory in nature.

System 400 of FIG. 4 includes an address/data bus 404 for communicating information, and a processor 406A coupled with bus 404 for processing information and instructions. As depicted in FIG. 4, system 400 is also well suited to a multi-processor environment in which a plurality of processors 406A, 406B, and 406C are present. Conversely, system 400 is also well suited to having a single processor such as, for example, processor 406A. Processors 406A, 406B, and 406C may be any of various types of microprocessors. System 400 also includes data storage features such as a computer usable volatile memory 408, e.g., random access memory (RAM), coupled with bus 404 for storing information and instructions for processors 406A, 406B, and 406C. System 400 also includes computer usable non-volatile memory 410, e.g., read only memory (ROM), coupled with bus 404 for storing static information and instructions for processors 406A, 406B, and 406C. Also present in system 400 is a data storage unit 412 (e.g., a magnetic or optical disk and disk drive) coupled with bus 404 for storing information and instructions. System 400 may also include an alphanumeric input device 414 including alphanumeric and function keys coupled with bus 404 for communicating information and command selections to processor 406A or processors 406A, 406B, and 406C. System 400 may also include cursor control device 416 coupled with bus 404 for communicating user input information and command selections to processor 406A or processors 406A, 406B, and 406C. In one embodiment, system 400 may also include display device 418 coupled with bus 404 for displaying information.

Referring still to FIG. 4, display device 418 of FIG. 4, when included, may be a liquid crystal device, cathode ray tube, plasma display device or other display device suitable for creating graphic images and alphanumeric characters recognizable to a user. Cursor control device 416, when included, allows the computer user to dynamically signal the movement of a visible symbol (cursor) on a display screen of display device 418 and indicate user selections of selectable items displayed on display device 418. Many implementations of cursor control device 416 are known in the art including a trackball, mouse, touch pad, joystick or special keys on alphanumeric input device 414 capable of signaling movement of a given direction or manner of displacement. Alternatively, it will be appreciated that a cursor can be directed and/or activated via input from alphanumeric input device 414 using special keys and key sequence commands. System 400 is also well suited to having a cursor directed by other means such as, for example, voice commands. System 400 also includes an I/O device 420 for coupling system 400 with external entities. For example, in one embodiment, I/O device 420 is a modem for enabling wired or wireless communications between system 400 and an external network such as, but not limited to, the Internet.

Referring still to FIG. 4, various other components are depicted for system 400. Specifically, when present, an operating system 422, applications 424, modules 426, data 428, and buddy memory allocator 429 are shown as typically residing in one or some combination of computer usable volatile memory 408 (e.g., RAM), computer usable non-volatile memory 410 (e.g., ROM), and data storage unit 412. In some embodiments, all or portions of various embodiments described herein are stored, for example, as an application 424 and/or module 426 in memory locations within RAM 408, computer-readable storage media within data storage unit 412, peripheral computer-readable storage media 402, and/or other tangible computer-readable storage media.

Example Method of Use

Figure 5:
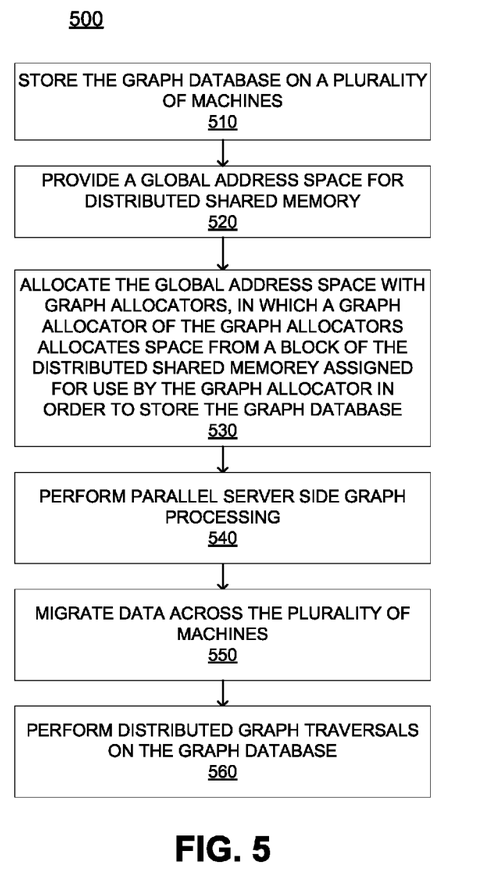
FIG. 5 is a flowchart of a method for distributing a graph storage system in a fault tolerant manner, which, in accordance with one embodiment, is implemented by a system for distributed graph storage.

The following discussion sets forth in detail the operation of some example methods of operation of embodiments. FIG. 5 illustrates example procedures used by various embodiments. Flow diagram 500 includes some procedures that, in various embodiments, are carried out by some of the electronic devices illustrated in FIG. 1, FIG. 4, or a processor under the control of computer-readable and computer-executable instructions. In this fashion, procedures described herein and in conjunction with flow diagram 500 are or may be implemented using a computer, in various embodiments. The computer-readable and computer-executable instructions can reside in any tangible computer readable storage media, such as, for example, in data storage features in memnodes/servers 110 such as RAM 408, ROM 410, and/or storage device 412 (all of FIG. 4). The computer-readable and computer-executable instructions, which reside on tangible computer readable storage media, are used to control or operate in conjunction with, for example, one or some combination of processor 406A, or other similar processor(s) 406B and 406C. Although specific procedures are disclosed in flow diagram 500, such procedures are examples. That is, embodiments are well suited to performing various other procedures or variations of the procedures recited in flow diagram 500. Likewise, in some embodiments, the procedures in flow diagram 500 may be performed in an order different than presented and/or not all of the procedures described in this flow diagram may be performed, additional operations may be added. It is further appreciated that procedures described in flow diagram 500 may be implemented in hardware, or a combination of hardware, with either or both of firmware and software (where the firmware and software are in the form of computer readable instructions).

FIG. 5 is a flow diagram 500 of an example method of distributed graph storage.

In operation 510, graph 200 is stored on a plurality of servers/memnodes 110. Logically, graph storage system 100 views application data as graph 200 (e.g., G=(V,E)) where V is the set of vertex objects 210 and E is the set of edge objects 220. In one example, to create graphs, graph storage system 100 provides a Graph class that comprises three basic data types: (1) vertex; (2) edge; and (3) property. Together they represent the application data. Property objects 230 can be attached to any vertex object 210 or edge object 220, and store associated data. In one embodiment, all of this data (e.g., graph 200, vertex objects 210, edge objects 220, etc.) is stored on servers/memnodes 110.

In operation 520, graph storage system 100 provides a global address space 130 for distributed global memory. As an example, graph storage system 100 requires a global address space 130 that can be provided by any distributed memory implementation. In one example, Sinfonia by Hewlett Packard, or a similar memory distribution technique is employed. Each server/memnode 110 in graph storage system 100 exports a flat memory space which is combined to create a single global address space 130. In one example, minitransactions, which are a form of distributed compare-and-swap type primitives, access data.

In operation 530, graph allocators 120 allocate global address space 130 such that a memory block 140 of the distributed global memory is assigned to service client 101 requests. As discussed herein, in one embodiment, due to the fixed size of vertex objects 210 and edge objects 220, these objects can be retrieved from a memnode 110 in one minitransaction since both the address and the size of the data are known in advance. Since vertex objects 210 and edge objects 220 may be merely a few tens of bytes, in some examples, the overheads of allocating and managing each such record through a buddy memory allocator 429 is high. As such, graph allocators 120 can pre-allocate large memory blocks of global address space 130 from a buddy memory allocator 429 associated with a server 110 and append vertex objects 210 and edge objects 220 until the memory block 140 is full.

In operation 540, in one embodiment, graph storage system 100 performs parallel server side graph 200 processing. Client 101 side processing can be very slow. In some embodiments, graph storage system 100 supports parallel server side graph processing similar to the Bulk Synchronous Parallel model. In this example, distributed graph functions execute in phases. In each phase parallel computations occur at the vertex objects 210 followed by message exchange with other vertex objects 210. The function terminates when all vertex objects 210 vote to halt. As discussed in examples herein, adding distributed graph functions (e.g., k-hop, k-core, etc.) in graph storage system 100 is simplified since graph storage system 100 employs memnodes 110 and the RPC framework to support the dispatch of messages between memnodes 110.

In operation 550, in one embodiment, migrator 150 migrates data across the plurality of servers/memnodes 110. Migrator 150 is a feature of graph storage system 100 which moves one or a plurality of vertex objects 210 when new servers 110 are added or when workload bottlenecks/hotspots occur on server 110. Migration in graph storage system 100 is an online operation such that other non-conflicting operations can continue in graph storage system 100.

Example Method of Use

Figure 6:
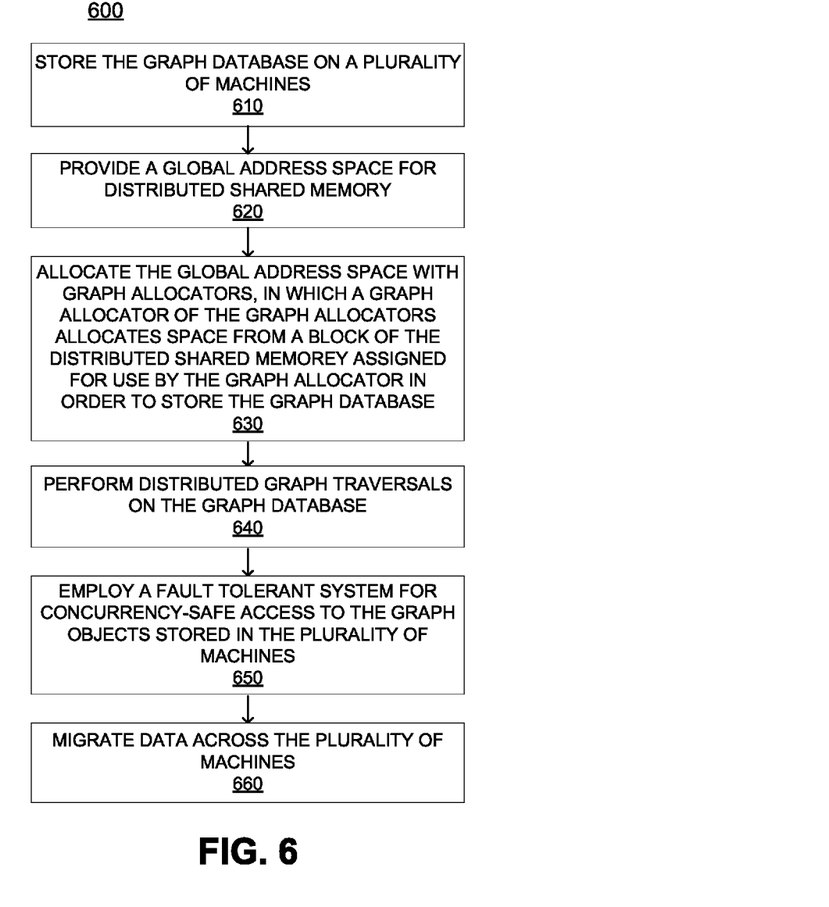
FIG. 6 is a flowchart of a method implemented by a system for distributed graph storage in accordance with one embodiment.

The following discussion sets forth in detail the operation of some example methods of operation of embodiments. FIG. 6 illustrates example procedures used by various embodiments. Flow diagram 600 includes some procedures that, in various embodiments, are carried out by some of the electronic devices illustrated in FIG. 1, FIG. 4, or a processor under the control of computer-readable and computer-executable instructions. In this fashion, procedures described herein and in conjunction with flow diagram 600 are or may be implemented using a computer, in various embodiments. The computer-readable and computer-executable instructions can reside in any tangible computer readable storage media, such as, for example, in data storage features of servers/memnodes 110 such as RAM 408, ROM 410, and/or storage device 412 (all of FIG. 4). The computer-readable and computer-executable instructions, which reside on tangible computer readable storage media, are used to control or operate in conjunction with, for example, one or some combination of processor 406A, or other similar processor(s) 406B and 406C. Although specific procedures are disclosed in flow diagram 600, such procedures are examples. That is, embodiments are well suited to performing various other procedures or variations of the procedures recited in flow diagram 600. Likewise, in some embodiments, the procedures in flow diagram 600 may be performed in an order different than presented and/or not all of the procedures described in this flow diagram may be performed, and/or one or more additional operations may be added. It is further appreciated that procedures described in flow diagram 600 may be implemented in hardware, or a combination of hardware, with either or both of firmware and software (where the firmware and software are in the form of computer readable instructions).

FIG. 6 is a flow diagram 600 of an example method of distributed graph storage.

In operation 610, graph storage system 100 is stored on a plurality of servers/memnodes 110. As discussed in an example above, graph storage system 100 views application data as graph 200 (e.g., G=(V,E)) where V is the set of vertex objects 210 and E is the set of edge objects 220. In one example, to create graphs, graph storage system 100 provides a Graph class that comprises three basic data types: (1) vertex; (2) edge; and (3) property. Together they represent the application data. Property objects 230 can be attached to any vertex or edge, and store associated data. All of this data (e.g., graph 200, vertex objects 210, edge objects 220, property objects 230, etc.) may be stored on servers/memnodes 110.

In operation 620, graph storage system 100 provides a global address space 130 for distributed global memory. As discussed in an example above, each server/memnode 110 in graph storage system 100 exports a flat memory space which is combined to create a single global address space 130. In one example, minitransactions access data.

In operation 630, graph allocators 120 allocate global address space 130 such that a memory block 140 of the distributed global memory is assigned to service client 101 requests. As discussed in an example above, the overheads of allocating and managing each graph object through a buddy memory allocator 429 is high. As such, graph allocators 120 can pre-allocate large memory blocks from a buddy memory allocator 429 associated with a server 110 and append vertex objects 210 and edge objects 220 until memory block 140 is full.

In operation 640, in one embodiment, graph storage system 100 performs distributed graph traversals on graph 200. As discussed above in an example, adding distributed graph functions (e.g., k-hop, k-core, etc.) in graph storage system 100 is simplified since graph storage system 100 employs memnodes 110 and the RPC framework to support dispatch of messages between memnodes 110.

In operation 650, in one embodiment, graph storage system 100 employs a fault toleration structure 160 for concurrency-safe access to graph objects stored in a plurality of servers/memnodes 110. As discussed in examples herein, graph storage system 100 employs a fault toleration structure 160 which may be a result of mechanisms such as memnodes and minitransactions. As discussed above in an example, graph storage system 100 may provide configuration options that prevent memnode failures such as disk imaging, logging, and primary-backup replication.

In operation 660, in one embodiment, migrator 150 migrates data across the plurality of servers/memnodes 110. As discussed in an example above, migrator 150 is a feature of graph storage system 100 which moves some vertex objects 210 when new servers 110 are added or when workload bottlenecks/hotspots occur on server 110. Migration in graph storage system 100 is an online operation such that other non-conflicting operations can continue in graph storage system 100.

Embodiments of the present technology are thus described. While the present technology has been described in particular examples, it should be appreciated that the present technology should not be construed as limited by such examples, but rather construed according to the following claims.

What is claimed is:

1. A method for implementing a graph storage system comprising:
   storing at least one graph on a plurality of computing systems;
   providing a global address space for distributed global memory, wherein each computing system of said plurality of computing systems, during a distribution of memory implantation, exports a flat memory space, wherein multiple flat memory spaces are combined to create said global address space; and
   managing said global address space with graph allocators, wherein a graph allocator of said graph allocators pre-allocates memory space from at least one memory block of said distributed global memory for use by said graph allocator in order to store said at least one graph, wherein graph objects are dynamically distributed across said plurality of computer systems via migrating internal data structures of said at least one graph across said plurality of computer systems,
   wherein said at least one graph is internally represented as a set of vertex objects and a set of edge objects, wherein a frequently accessed property is embedded in at least one of said set of vertex objects and said set of edge objects, such that retrieving said frequently accessed property may be accomplished in a single network access.

2. The method of claim 1 further comprising:
   performing parallel server side graph processing and distributed traversals.

3. The method of claim 1 further comprising:
   migrating data across said plurality of computing systems.

4. The method of claim 1 wherein said graph storage system employs buddy memory allocators and said graph allocators pre-allocate a plurality of blocks of said distributed global memory from said buddy memory allocators to reduce network roundtrips during allocation.

5. The method of claim 1 wherein said graph storage system is fault tolerant.

6. The method of claim 5 wherein a fault tolerant configuration employs distributed memnodes that support conducting minitransactions providing concurrency-safe access to graph objects stored in said plurality of computing systems.

7. The method of claim 1 wherein said graph storage system can scale by distributing a data set across partitions.

8. The method of claim 1, wherein each of said plurality of vertex objects comprises associated properties, and wherein each of said plurality of edge objects comprises associated properties.

9. The method of claim 8 wherein a size of said associated properties is dynamic.

10. A computer-usable storage medium having instructions embodied therein that when executed cause a plurality of computing systems to perform a method for distributing a graph storage system in a fault tolerant manner, said method comprising:
    storing at least one graph on a plurality of computing systems, wherein said graph comprises graph objects;
    providing a global address space for distributed global memory, wherein each computing system of said plurality of computing systems, during a distribution of memory implantation, exports a flat memory space, wherein multiple flat memory spaces are combined to create said global address space;
    managing said global address space with graph allocators, wherein a graph allocator of said graph allocators pre-allocates memory space from at least one memory block of said distributed global memory for use by said graph allocator in order to store said at least one graph, wherein graph objects are dynamically distributed across said plurality of computer systems via migrating internal data structures of said at least one graph across said plurality of computer systems, and wherein said at least one graph is internally represented as a set of vertex objects and a set of edge objects, wherein a frequently accessed property is embedded in at least one of said set of vertex objects and said set of edge objects, such that retrieving said frequently accessed property may be accomplished in a single network access;
    performing distributed graph traversals on said graph; and
    employing a fault toleration structure for concurrency-safe access to said graph objects stored in said plurality of computing systems.

11. The computer-usable storage medium of claim 10 wherein said method further comprises:
    migrating data across said plurality of computing systems.

12. The computer-usable storage medium of claim 10 wherein said fault toleration structure comprises distributed memnodes that support conducting minitransactions providing concurrency-safe access to graph objects stored in said plurality of computing systems.

13. The computer-usable storage medium of claim 10, wherein each of said plurality of vertex objects comprises associated properties, and wherein each of said plurality of edges comprises associated properties.

14. A computer-usable storage medium having computer readable program code embedded therein that when executed causes a plurality of computing systems to implement a graph storage system, said graph storage system comprising:
   a graph store to store at least one graph on a plurality of computing systems;
   a graph allocator to manage global address space from at least one memory block of distributed global memory, wherein said at least one memory block of said distributed global memory is for use by said graph allocator in order to store said at least one graph, wherein each computing system of said plurality of computing systems, during a distribution of memory implantation, exports a flat memory space, wherein multiple flat memory spaces are combined to create said global address space, wherein graph objects are dynamically distributed across said plurality of computer systems via migrating internal data structures of said at least one graph across said plurality of computer systems, and wherein said at least one graph is internally represented as a set of vertex objects and a set of edge objects, wherein a frequently accessed property is embedded in at least one of said set of vertex objects and said set of edge objects, such that retrieving said frequently accessed property may be accomplished in a single network access; and
   a migrator to migrate data stored within said graph storage system from a first computing system of said plurality of computing systems to a second computing system of said plurality of computing systems.

15. The computer-usable storage medium of claim 14, wherein said graph storage system further comprises:
   a fault toleration structure comprising distributed memnodes to support minitransactions providing concurrency-safe access to graph objects stored in said plurality of computing systems.

* * * * *